Oct. 8, 1935.     J. S. WEIGHTMAN     2,016,583
MEASURING TAP
Filed March 31, 1934
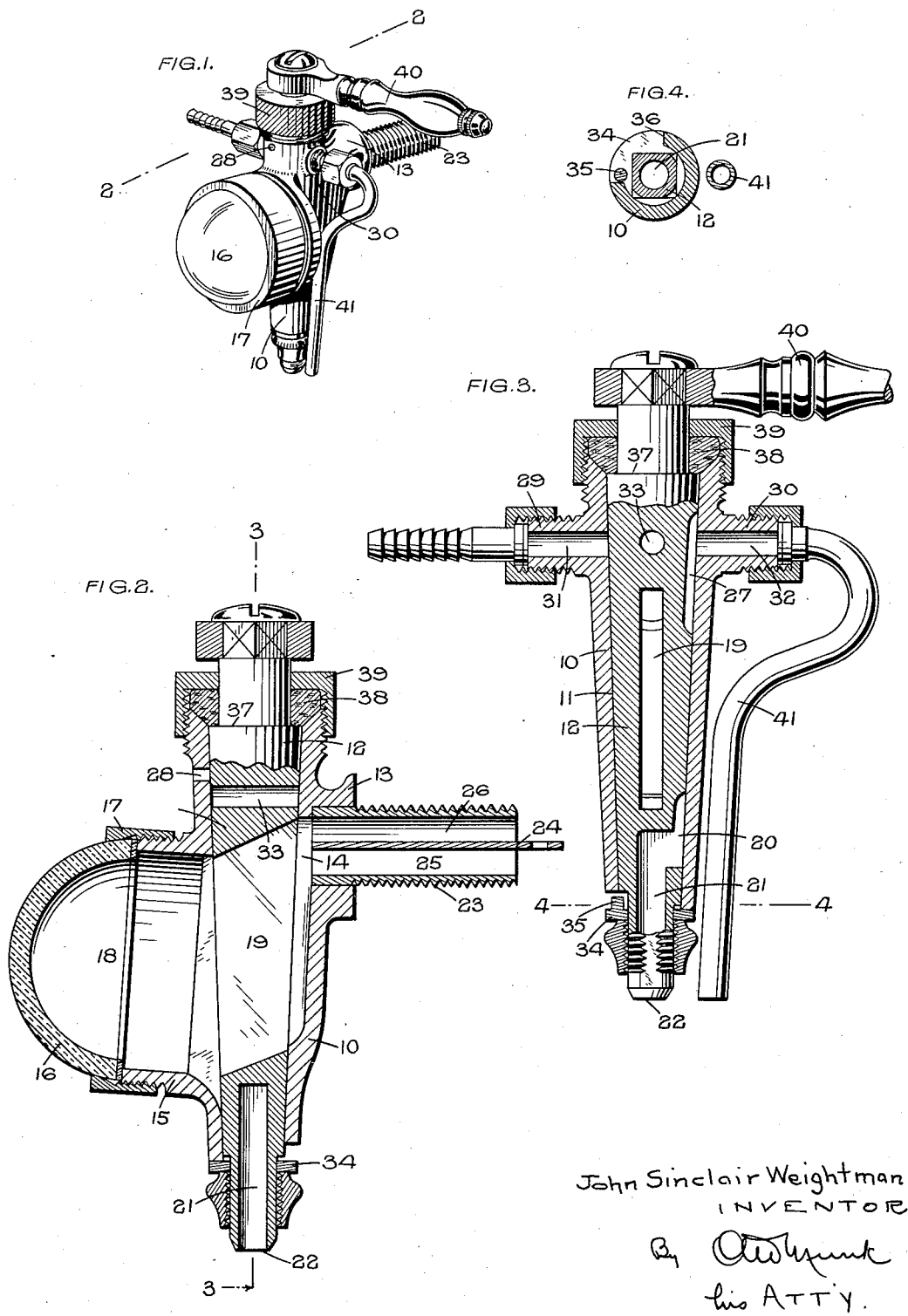
John Sinclair Weightman
INVENTOR
By [signature]
his ATTY.

Patented Oct. 8, 1935

2,016,583

UNITED STATES PATENT OFFICE 2,016,583

MEASURING TAP

John Sinclair Weightman, Dale End, Birmingham, England, assignor to Gaskell & Chambers, Limited, Birmingham, England, a company of Great Britain Application March 31, 1934, Serial No. 718,439
In Great Britain December 21, 1933

11 Claims. (Cl. 225—26)

This invention relates to measuring taps of the kind which comprises a casing having a valve seat, a valve cooperating with the valve seat, the casing also having a measuring chamber associated with it, and the valve being operable so that in one position it permits of flow of the liquid into the measuring chamber, but cuts off the discharge passage from the measuring chamber, and in the other position cuts off connection between the inlet for liquid and the measuring chamber, but permits of discharge from the measuring chamber to the discharge outlet.

The object of the present invention is to provide an improved or simplified construction of measuring tap which will control the discharge of two separate liquids, one of which is delivered in measured quantities.

Referring to the drawing:—

Figure 1 is a perspective view of one form of measuring tap constructed in accordance with this invention.

Figure 2 is a cross sectional view on the line 2—2 of Figure 1.

Figure 3 is a cross sectional view on the line 3—3 of Figure 2.

Figure 4 is a section on the line 4—4 of Figure 3.

In the construction illustrated, the tap comprises a casing 10 of hollow tubular form to provide therein a valve seat 11 of part conical shape.

Pivotally mounted within the casing for movement about a substantially vertical axis and in engagement with the valve seat is a plug valve 12 of tapered form.

Formed on one side of the casing and in the upper portion thereof is a boss 13 which is apertured centrally to form an inlet port 14 for supplying primary liquid to the valve.

That side of the casing which is opposite to the primary inlet port 14 is formed with an open ended measuring chamber portion 15 of circular form, the open end of which is closed by a glass panel 16 of part spherical shape secured detachably to the portion 15 by means of a clamping nut 17 to provide a hollow measuring chamber 18.

For permitting the passage of primary liquid from the primary inlet port to the measuring chamber, the valve is formed transversely with a primary liquid supply port 19 of somewhat slot-like form, and for permitting the flow of the measured liquid from the measuring chamber to the exterior of the tap, the valve is provided further with a primary liquid discharge port 20 arranged in a plane at right angles to the plane containing the supply port, and this primary discharge port is arranged to communicate by means of a passage 21 formed axially in the valve with a primary liquid delivery orifice 22 formed in the lower end of the valve which is arranged to extend beyond the adjacent end of the casing for this purpose.

The boss 13 on the casing is provided with a pipe 23 adapted for connection to the primary liquid supply, and for permitting the egress of air from the measuring chamber during the supply of primary liquid thereto, this pipe is formed centrally with a horizontal partition member 24 to provide therein a pair of passages 25 and 26 adapted respectively to provide means for conducting the primary liquid to the inlet port 14 and to provide a passage for the displaced air.

For venting the measuring chamber 18 during the discharge of primary liquid therefrom, the valve 12 is formed on one side of its upper portion with an axial slot 27 which, when the valve is in the position of discharge, is adapted to provide a communication from a vent orifice 28 formed in the upper portion of the casing to the measuring chamber 18 to allow of the entrance of air thereto.

Formed on the upper portion of the casing on opposite sides thereof, and in a plane at right angles to the plane containing the primary liquid inlet port and the measuring chamber, are a pair of bosses 29 and 30 of hollow form to provide respectively therein inlet and outlet passages 31 and 32 adapted to supply and discharge secondary liquid from and to the valve.

To provide a communication between these two passages, the valve is formed diametrically in its upper portion with a secondary port 33 arranged at right angles to the plane containing the primary discharge port 20, so that when the latter is in communication with the measuring chamber for discharging primary liquid therefrom, the inlet and outlet passages 31 and 32 are placed in communication to permit of the passage of secondary liquid.

In order that the secondary liquid shall be delivered from the tap adjacent the primary liquid delivery orifice 22, the boss 30 is provided with a secondary liquid delivery pipe 41 arranged more or less vertical and with its lower end adjacent the said orifice 22, and this pipe is secured detachably to the boss 30 independently of the primary liquid delivery orifice, so that it can be readily removed for cleaning purposes.

For limiting the pivotal movement of the tap from a position in which the supply port 19 is in communication with the primary inlet port and measuring chamber to a position in which the latter is in communication with the discharge port 20, the exterior of the lower end of the valve is formed of a reduced square section, and upon this reduced section is mounted a stop washer 34 formed integrally with an axially projecting lug 35 which cooperates with a slot 36 of part circular form provided on the lower end of the casing.

For securing the valve on its seating, the upper end thereof is shouldered at 37, and this shouldered part is engaged by a gland washer and gland nut 38 and 39 carried on the upper end of the casing, while for operating the valve the upper end thereof is provided with a handle 40.

In use the pipe 23 and the hollow boss 29 are connected respectively to a suitable source of primary and secondary liquid, which may for instance be a spirit such as whisky, and water or soda, and the valve is turned into a position in which, as shown in Figure 2, the supply port 19 provides a passage from the inlet port 14 to the measuring chamber to permit of the flow of primary liquid thereto until the latter is filled; whereupon the valve is turned through a right angle until the primary discharge port 20 is in communication with the measuring chamber to permit of the flow of the measured liquid therefrom. This turning movement of the valve brings the secondary port 33 into communication with the secondary inlet and outlet passages 31 and 32 to permit of the simultaneous discharge of the secondary and primary liquid from the tap.

When the measuring chamber 18 is empty, the valve may be turned to its original position, or alternatively the discharge of secondary liquid can be continued until the required quantity has been obtained.

What I claim then is:—

1. A measuring tap comprising in combination a casing, a valve seat provided in said casing, a valve cooperating with said valve seat, a measuring chamber associated with the casing, said casing having primary and secondary inlet means adapted to supply respectively primary and secondary liquid to the valve, said valve being movable from a supply position to a delivery position and adapted in the supply position to permit of the flow of primary liquid from said primary inlet means to the measuring chamber, means adapted to deliver primary and secondary liquid from the tap, said valve being adapted in the delivery position to permit of the discharge of primary liquid from said measuring chamber to said liquid delivery means, said casing having vent means controllable by said valve adapted to admit air into said chamber when the valve is in the delivery position, and said valve in such position being adapted to allow the simultaneous discharge of secondary liquid from the tap.

2. A measuring tap, comprising in combination a casing, a valve seat provided in said casing, a valve cooperating with said valve seat, a measuring chamber associated with the casing, said casing having primary and secondary inlet means adapted to supply respectively primary and secondary liquid to the valve, said valve being movable from a supply position to a delivery position adapted in the supply position to permit of the flow of primary liquid from said primary inlet means to the measuring chamber, means adapted to deliver primary liquid from the tap, said casing having a port adapted to receive secondary liquid from the valve, a pipe communicating with said port and adapted to deliver secondary liquid from the tap, means adapted to secure the pipe detachably to the casing independently of the primary liquid delivery means, said valve being adapted in the delivery position to permit of the discharge of primary liquid from said measuring chamber to said liquid delivery means, said casing having vent means controllable by said valve adapted to admit air into said chamber when the valve is in the delivery position, and said valve in such position being adapted to place said secondary inlet means and said port in communication to allow the simultaneous discharge of secondary liquid from said delivery pipe.

3. A measuring tap, comprising in combination a tubular casing, a plug valve mounted in said casing for pivotal movement about a substantially vertical axis, a measuring chamber associated with the casing, said casing having primary inlet means adapted to supply primary liquid to the valve, the tap having means adapted to deliver the primary liquid, said valve having a primary supply port adapted to provide a passage from said primary inlet means to the measuring chamber, and a primary discharge port adapted to provide a passage from said measuring chamber to said delivery means, said casing having in its upper portion secondary inlet and outlet passages adapted respectively to supply and discharge secondary liquid to and from said valve, said valve having in its upper portion a secondary port adapted to provide a communication between said inlet and outlet passages, said casing having also a vent orifice communicating with the atmosphere, and said valve having a vent port adapted to provide a communication between the upper part of said measuring chamber and said vent orifice.

4. A measuring tap, comprising in combination a tubular casing, a plug valve mounted in said casing for pivotal movement about a substantially vertical axis, the casing having a primary inlet port adapted to supply primary liquid to the valve, a measuring chamber associated with the casing and disposed substantially oppositely to the primary inlet port, said casing having in its upper portion secondary inlet and outlet passages arranged transversely of the plane containing the measuring chamber and said port, said passages being disposed on opposite sides of the casing and adapted respectively to supply and discharge secondary liquid from and to said valve, the valve having a transverse primary supply port adapted to provide a passage from said primary inlet port to the measuring chamber, a primary liquid delivery orifice in its lower end, a delivery passage extending upwardly from said orifice and axially of the valve, the latter having also a primary discharge port formed in one side thereof, said port being adapted to provide a communication from said measuring chamber to said delivery passage and being arranged transversely of said primary supply port, a secondary port arranged transversely of said discharge port and adapted to provide a communication between said inlet and outlet passages, said casing having a vent orifice extending through the wall thereof and disposed above said measuring chamber, said valve having a vent port extending substantially vertical, and said vent port being disposed substantially above said primary discharge port and adapted to provide a communication between the measuring chamber and said vent orifice.

5. A measuring tap, comprising in combination a tubular casing, a plug valve mounted in said casing for pivotal movement about a substantially vertical axis, the casing having a primary inlet port adapted to supply primary liquid to the valve, a measuring chamber associated with the casing and disposed substantially oppositely to the primary inlet port, said casing having in its upper portion secondary inlet and outlet passages arranged transversely of the plane containing the measuring chamber and said port, said passages being disposed on opposite sides of the casing and adapted respectively to supply and discharge secondary liquid from and to said valve, the valve having a transverse primary supply port adapted to provide a passage from said primary inlet port to the measuring chamber, a primary liquid delivery orifice in its lower end, a primary discharge port adapted to provide a passage from said measuring chamber to said delivery orifice and arranged transversely of said primary supply port, and a secondary port arranged transversely of said discharge port and adapted to provide a communication between said inlet and outlet passages, means for venting the measuring chamber during the discharge of primary liquid therefrom, a pipe communicating with said outlet passage and having a delivery orifice adapted to deliver the secondary liquid, and said secondary liquid delivery orifice being disposed adjacent said primary liquid delivery orifice.

6. A measuring tap, comprising in combination a casing, a valve seat provided in said casing, a valve co-operating with said valve seat, a measuring chamber associated with the casing, said casing having primary and secondary inlet means adapted to supply respectively primary and secondary liquid to the valve, said tap having primary and secondary liquid discharge passages, primary and secondary liquid delivery orifices, said passages providing respectively a communication between said valve seat and said orifices, the latter being adapted to deliver the two liquids in separate streams, said valve being movable from a supply to a delivery position and adapted in the supply position to permit of the flow of the primary liquid from said primary inlet means to the measuring chamber, said casing having vent means controllable by said valve adapted to admit air into said chamber when the valve is in the delivery position, and said valve being adapted in the delivery position to permit of the discharge of the primary liquid from said measuring chamber to said primary discharge passage and to allow of the simultaneous flow of the secondary liquid from said secondary inlet means to said secondary discharge passage.

7. A measuring tap, comprising in combination a tubular casing, a plug valve mounted in said casing for pivotal movement about a substantially vertical axis, a measuring chamber associated with the casing, said casing having primary inlet means adapted to supply primary liquid to the valve, said valve having a primary supply port adapted to provide a passage from said primary inlet means to the measuring chamber, said casing having in its upper portion secondary inlet and outlet passages adapted respectively to supply and discharge secondary liquid to and from said valve, said valve being movable from a supply to a delivery position and having a primary liquid discharge port adapted with the valve in the delivery position to communicate with said measuring chamber, said tap having primary and secondary liquid delivery orifices, said orifices being adapted to deliver the two liquids in separate streams, said discharge port and said outlet passage being adapted respectively to communicate with said orifices, and said valve having in its upper portion a secondary port adapted with the valve in the delivery position to provide a communication between said inlet and outlet passages.

8. A measuring tap, comprising in combination a tubular casing, a plug valve mounted movably in said casing and adapted for pivotal movement about a substantially vertical axis from a supply to a delivery position, a measuring chamber associated with the casing, said casing having primary inlet means adapted to supply primary liquid to the valve, the tap having means adapted to deliver the primary liquid, said valve having a primary supply port adapted with the valve in the supply position to provide a passage from said primary inlet means to said measuring chamber, and a primary discharge port adapted with the valve in the delivery position to provide a communication from said measuring chamber to said delivery means, secondary inlet and outlet bosses disposed each on opposite sides of the upper portion of the casing, said bosses having respectively inlet and outlet passages extending therethrough to said valve, said passages being each of straight line form and arranged in line, means for detachably securing secondary liquid supply and delivery pipes one to each of said respective bosses, and said valve having in its upper portion a secondary port of straight line form extending transversely therethrough and adapted with the valve in the delivery position for disposition in line with said inlet and outlet passages and to provide therebetween a passage for secondary liquid.

9. A measuring tap, comprising in combination, a tubular casing, a plug valve mounted movably in said casing and adapted for pivotal movement about a substantially vertical axis from a supply to a delivery position, a measuring chamber associated with the casing, said casing having primary and secondary inlet passages adapted respectively to supply primary and secondary liquid to the valve, said tap having means adapted to deliver primary and secondary liquid therefrom, said valve being adapted to permit of the flow of primary liquid from said primary inlet passage to the measuring chamber when in the supply position and to permit of the discharge of said primary liquid from said measuring chamber to said liquid delivery means simultaneous with the discharge of secondary liquid when in the delivery position, a partition extending longitudinally of said primary inlet passage adapted to provide an exit for air displaced from said measuring chamber during the supply of primary liquid thereto, and said casing having vent means controllable by said valve adapted to admit air into the upper part of said measuring chamber on movement of the valve into the delivery position.

10. A measuring tap, comprising in combination a tubular casing, a plug valve mounted in said casing for pivotal movement about a substantially vertical axis, the casing having a primary inlet port adapted to supply primary liquid to the valve, a partition extending substantially centrally and longitudinally thereof, a measuring chamber associated with the casing and disposed substantially oppositely to the primary inlet port, the valve having a transverse primary supply port adapted to provide a passage from said primary inlet port to the measuring chamber, a primary liquid delivery orifice in its lower end, a delivery passage extending upwardly from said orifice and axially of the valve, the latter having also a primary discharge port formed in one side thereof, said port being adapted to provide a communication from said measuring chamber to said delivery passage and being arranged transversely of said primary supply port, said casing having a vent orifice extending through the wall thereof and disposed above said measuring chamber, said valve having a vent port extending substantially vertical, said vent port being disposed substantially above said primary discharge port and adapted to provide a communication between the measuring chamber and said vent orifice, secondary inlet and outlet bosses disposed each on opposite sides of the upper portion of the casing, and transversely of the plane containing the measuring chamber and said port, said bosses having respectively inlet and outlet passages extending therethrough to said valve, said passages being each of straight line form and arranged in line, means for detachably securing secondary liquid supply and delivery pipes one to each of said respective bosses, said valve having in its upper portion a secondary port arranged transversely of said primary discharge port, and said secondary port being of straight line form and adapted for disposition in line with said inlet and outlet passages and to provide therebetween a passage for secondary liquid.

11. A measuring tap, comprising in combination a tubular casing, a plug valve mounted movably in said casing and adapted for pivotal movement about a substantially vertical axis from a supply to a delivery position, the casing having a primary inlet port adapted to supply primary liquid to the valve, with the latter in the supply position, a measuring chamber associated with the casing and disposed substantially oppositely to the primary inlet port, the tap having at its lower end an orifice adapted to deliver the primary liquid, the valve having a transverse primary supply port adapted to provide a passage from said primary inlet port to the measuring chamber, a primary discharge port adapted to provide a passage from said measuring chamber to said orifice with the valve in the delivery position, bosses disposed each on opposite sides of the upper portion of said casing and arranged transversely of the plane containing the measuring chamber and said primary inlet port, said bosses having each a passage for secondary liquid extending therethrough to said valve, a pipe having an orifice adapted to discharge liquid therefrom, means for securing said pipe detachably to either of said bosses with its discharge orifice adjacent said primary liquid delivery orifice and with the two orifices in a plane disposed at right angles to the plane containing the measuring chamber and primary inlet port, means for securing a secondary liquid supply pipe detachably to the remaining boss, and said valve having a secondary port adapted with the valve in the delivery position to provide a communication between said secondary liquid passages.

JOHN S. WEIGHTMAN.